US012335709B2

(12) United States Patent
Lv et al.

(10) Patent No.: US 12,335,709 B2
(45) Date of Patent: Jun. 17, 2025

(54) SOUND GENERATOR

(71) Applicant: AAC Microtech (Changzhou) Co., Ltd., Changzhou (CN)

(72) Inventors: Xuedong Lv, Shenzhen (CN); Xiaoqiong Feng, Shenzhen (CN); Kun Yang, Shenzhen (CN); Zhen Huang, Shenzhen (CN); Yi Shao, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 197 days.

(21) Appl. No.: 18/097,460

(22) Filed: Jan. 16, 2023

(65) Prior Publication Data

US 2024/0073622 A1 Feb. 29, 2024

Related U.S. Application Data

(63) Continuation of application No. PCT/CN2022/114673, filed on Aug. 25, 2022.

(51) Int. Cl.

| | |
|---|---|
| ***H04R 25/00*** | (2006.01) |
| ***H04R 7/16*** | (2006.01) |
| ***H04R 9/04*** | (2006.01) |
| ***H04R 9/06*** | (2006.01) |

(52) U.S. Cl.

CPC ............... *H04R 9/046* (2013.01); *H04R 7/16* (2013.01); *H04R 9/045* (2013.01); *H04R 9/06* (2013.01); *H04R 2400/11* (2013.01)

(58) Field of Classification Search

CPC .............. H04R 1/2811; H04R 2207/00; H04R 2499/11; H04R 7/127; H04R 9/025; H04R 9/046; H04R 9/06; H04R 31/003; H04R 7/20

USPC .......................................................... 381/400

See application file for complete search history.

(56) References Cited

FOREIGN PATENT DOCUMENTS

WO WO-2020181891 A1 * 9/2020

OTHER PUBLICATIONS

WO-2020181891-A1. Translation (Year: 2020).*

* cited by examiner

*Primary Examiner* — Phylesha Dabney

(74) *Attorney, Agent, or Firm* — Wiersch Law Group

(57) ABSTRACT

A sound generator provided in the present disclosure includes a frame, a magnetic circuit unit, and a first vibration unit and a second vibration unit arranged on two sides of the magnetic circuit unit. The magnetic circuit unit includes a first central magnetic yoke in the middle, a central magnet fixed to the first central magnetic yoke, a magnetic component arranged around the central magnet and fixed to the frame, and a connecting portion connecting the first central magnetic yoke to the magnetic component. The central magnet includes a first magnet portion fixed to the first central magnetic yoke and a second magnet portion fixed to the side of the first magnet portion away from the first central magnetic yoke, a projection area of the first magnet portion along a vibrating direction is greater than a projection area of the second magnet portion along the vibrating direction.

7 Claims, 3 Drawing Sheets

SOUND GENERATOR

TECHNICAL FIELD

The present disclosure relates to the technical field of electroacoustic transformation, and in particular, to a sound generator for a portable mobile terminal.

BACKGROUND

With the development of portable mobile terminal technologies, people have higher and higher requirements for sound effects of portable mobile terminals. At the same time, with the development of lightweight and thinness of the portable mobile terminals, sound generators are also required to follow the development trend of lightweight and thinness.

In an existing sound generator, in order to improve acoustic performance of the sound generator, the technical solution in which two diaphragms produce sound on two sides is generally adopted. Generally, a magnetic circuit unit of a sound generator producing sound on two sides includes a main yoke in the middle, a main magnet fixed to the main yoke, and a side yoke arranged around the main magnet and forming a magnetic gap with the main magnet. On this basis, there is a need to increase the number of magnet or a volume of the main magnet so as to enhance performance of a magnetic field to improve the acoustic performance, which is bound to increase the volume of the sound generator increase and is not conducive to lightweight and thinness.

Therefore, there is a need to provide a new sound generator to solve the above technical problems.

SUMMARY

An objective of the present disclosure is to provide a sound generator with better acoustic performance.

In order to achieve the above objective, the present disclosure provides a sound generator, including a frame with an accommodation space, a magnetic circuit unit accommodated in the accommodation space, and a first vibration unit and a second vibration unit arranged on two sides of the magnetic circuit unit respectively, wherein the magnetic circuit unit includes a first central magnetic yoke in a middle position, a central magnet fixed to the first central magnetic yoke, a side magnet component arranged around the central magnet and fixed to the frame, and a connecting portion connecting the first central magnetic yoke to the side magnet component, the central magnet and the side magnet component are spaced to form a magnetic gap;

the first vibration unit includes a first diaphragm fixed to the frame and a first voice coil driving the first diaphragm to vibrate to produce sound, the first voice coil is arranged to insert into the magnetic gap;

the second vibration unit includes a second diaphragm fixed to the frame and a second voice coil driving the second diaphragm to vibrate to produce sound, the second voice coil is arranged to insert into the magnetic gap; and the central magnet includes a first magnet portion fixed to the first central magnetic yoke and a second magnet portion fixed to the side of the first magnet portion away from the first central magnetic yoke, a projection area of the first magnet portion along a vibrating direction is greater than a projection area of the second magnet portion along the vibrating direction.

As an improvement, the magnetic gap includes a first magnetic gap formed by the first magnet portion and the side magnet component that are spaced apart from each other and a second magnetic gap formed by the second magnet portion and the side magnet component that are spaced apart from each other, the first voice coil is arranged to insert into the first magnetic gap, and the second voice coil is arranged to insert into the second magnetic gap.

As an improvement, the side magnet component includes a side magnet fixed to the frame, a first side magnetically conductive plate fixed to a side of the side magnet facing the first diaphragm, and a second side magnetically conductive plate fixed to a side of the side magnet facing the second diaphragm, and the connecting portion connects the second side magnetically conductive plate and the first central magnetic yoke.

As an improvement, the connecting portion includes a first connecting portion connected to the first central magnetic yoke, a second connecting portion connected to the second side magnetically conductive plate, and a third connecting portion connecting the first connecting portion and the second connecting portion, the first connecting portion is fixed to a surface of the first central magnetic yoke facing the central magnet, the second connecting portion is fixed to a surface of the second side magnetically conductive plate facing the first central magnetic yoke.

As an improvement, the third connecting portion extends along the vibrating direction.

As an improvement, the frame is in a shape of a rectangle, and the connecting portion is connected to edges of the second side magnetically conductive plate and the first central magnetic yoke along a minor axis direction.

As an improvement, the magnetic circuit unit further includes a second central magnetic yoke fixed to the side of the second magnet portion away from the first central magnetic yoke.

As an improvement, the frame includes a first bracket and a second bracket connected to each other, the first diaphragm is fixed to a surface of the first bracket away from the second bracket, and the second diaphragm is fixed to a surface of the second bracket away from the first bracket.

As an improvement, the side magnet includes a first side magnet arranged along a major axis direction and a second side magnet arranged along a minor axis direction.

As an improvement, four first side magnets are provided, and two of the first side magnets are arranged in each major axis direction of the frame.

Compared with the related art, the sound generator according to the present disclosure includes a first vibration unit and a second vibration unit arranged on two sides of a magnetic circuit unit respectively. The magnetic circuit unit includes a first central magnetic yoke in the middle, a central magnet fixed to the first central magnetic yoke, a magnetic component arranged around the central magnet and fixed to the frame, and a connecting portion connecting the first central magnetic yoke to the side magnet component. The central magnet and the side magnet component are spaced to form a magnetic gap. The central magnet includes a first magnet portion fixed to the first central magnetic yoke and a second magnet portion fixed to the side of the first magnet portion away from the first central magnetic yoke. A projection area of the first magnet portion along a vibrating direction is greater than a projection area of the second magnet portion along the vibrating direction. The arrangement of the first magnet portion having a greater projection area than the second magnet portion effectively increases a volume of the central magnet, and improves performance of a magnetic field of the magnetic circuit unit in a limited space design, thereby improving acoustic performance of the sound generator.

BRIEF DESCRIPTION OF DRAWINGS

In order to more clearly illustrate the technical solutions in the embodiments of the present disclosure, the accompanying drawings used in the description of the embodiments will be briefly introduced below. It is apparent that, the accompanying drawings in the following description are only some embodiments of the present disclosure, and other drawings can be obtained by those of ordinary skill in the art from the provided drawings without creative efforts.

DESCRIPTION OF EMBODIMENTS

The technical solutions in the embodiments of the present disclosure are clearly and fully described below with reference to the accompanying drawings in the embodiments of the present disclosure.

Figure 1:
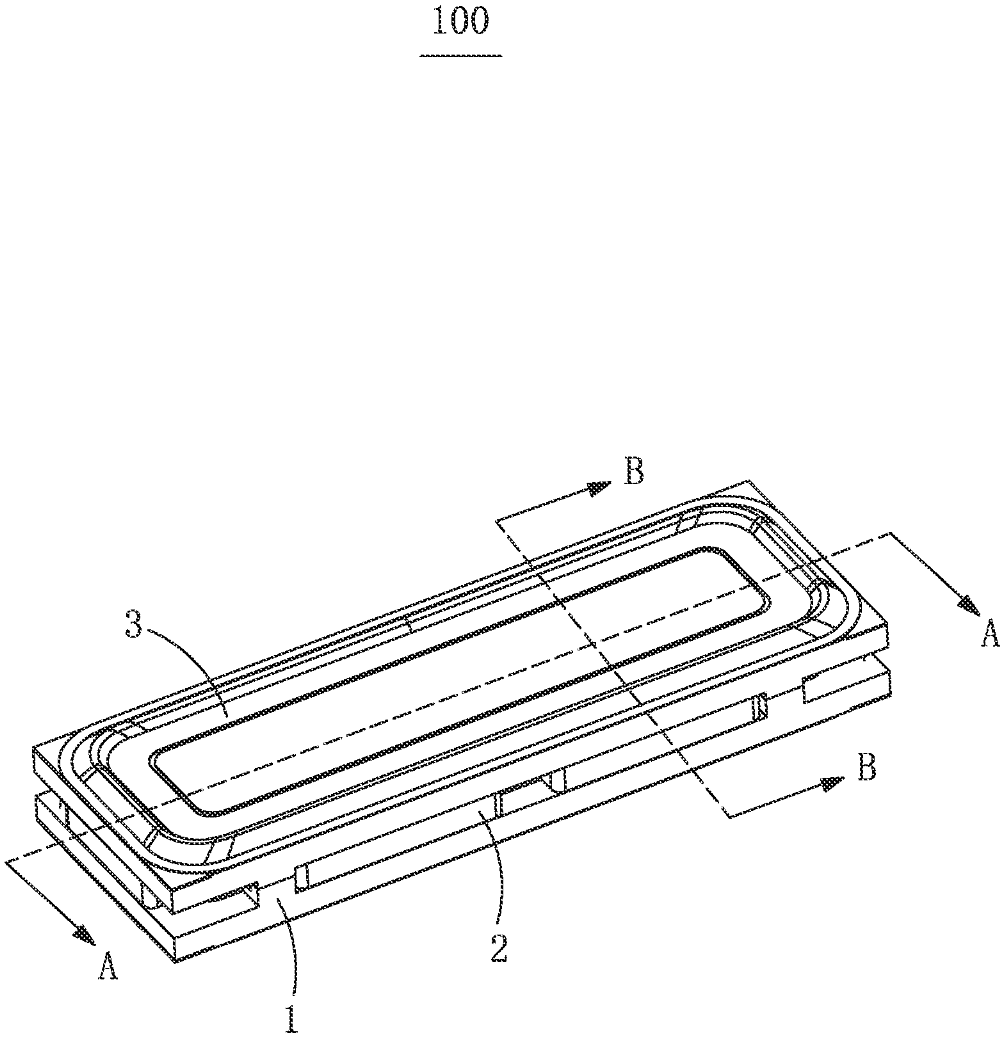
FIG. 1 is a three-dimensional view of a sound generator according to the present disclosure.
Figure 2:
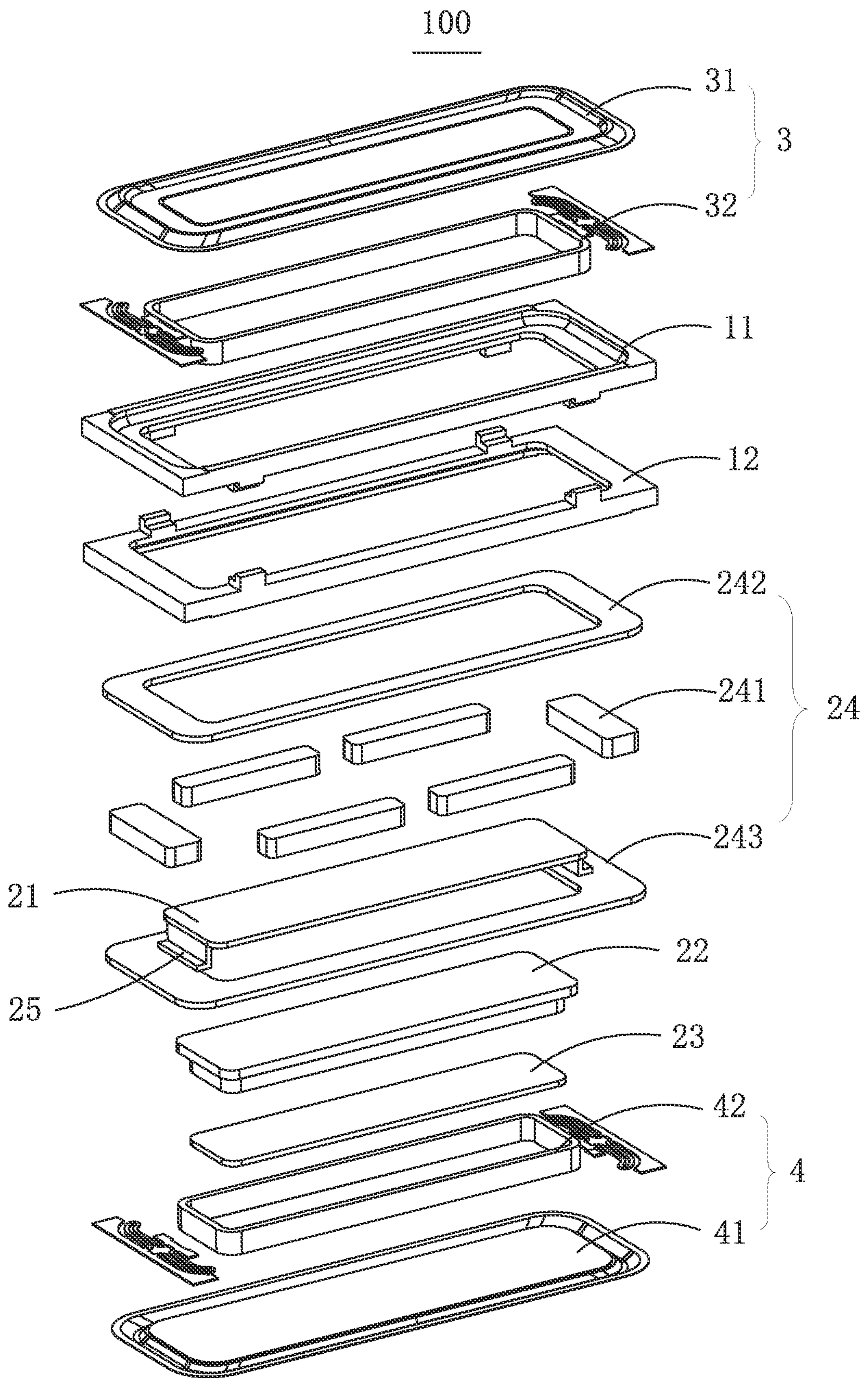
FIG. 2 is an exploded view of a sound generator according to the present disclosure.
Figure 3:
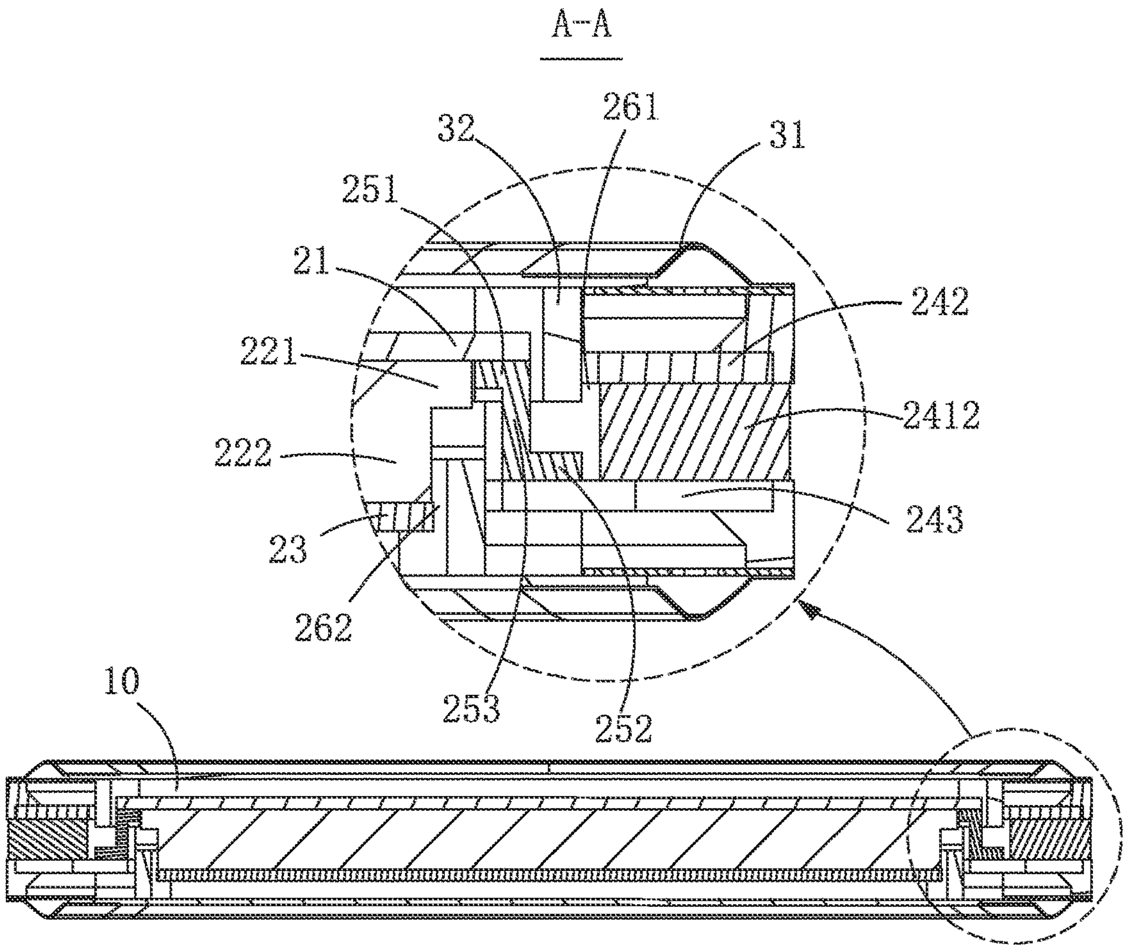
FIG. 3 is a sectional view taken along a line A-A in FIG. 1.
Figure 4:
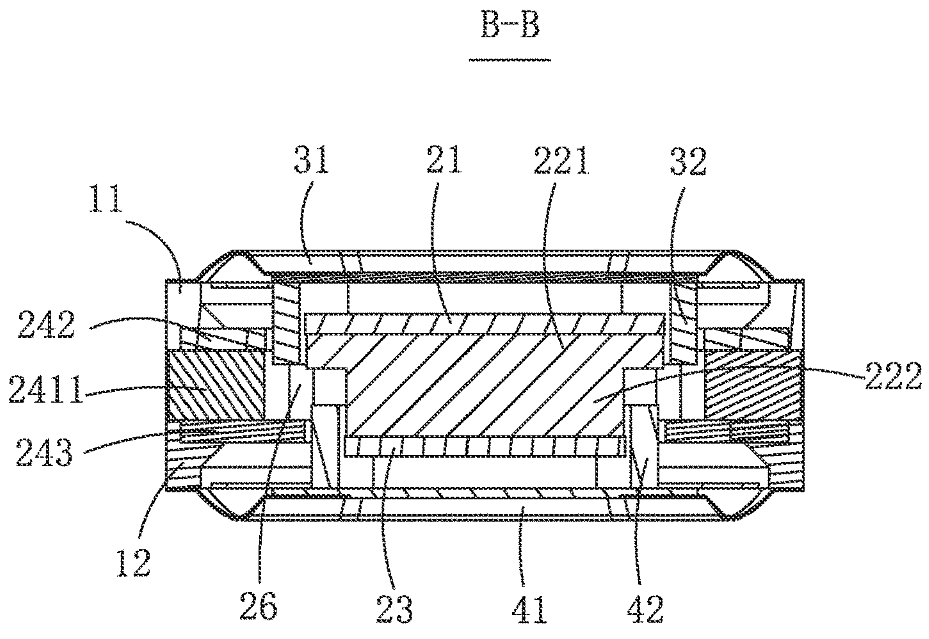
FIG. 4 is a sectional view taken along a line B-B in FIG. 1.

As shown in FIG. 1 to FIG. 4, the present disclosure provides a sound generator 100, including a frame 1 with an accommodation space 10, a magnetic circuit unit 2 accommodated in the accommodation space 10, and a first vibration unit 3 and a second vibration unit 4 arranged on two sides of the magnetic circuit unit 2 respectively. The first vibration unit 3 and the second vibration unit 4 are fixed to two opposite sides of the frame 1 respectively. Specifically, the frame 1 includes a first bracket 11 and a second bracket 12 connected to each other, the first vibration unit 3 is fixed to a surface of the first bracket 11 away from the second bracket 12, and the second vibration unit 4 is fixed to a surface of the second bracket 12 away from the first bracket 11.

The magnetic circuit unit 2 includes a first central magnetic yoke 21 in the middle, a central magnet 22 fixed to the first central magnetic yoke 21, a second central magnetic yoke 23 fixed to the side of the central magnet 22 away from the first central magnetic yoke 21, a side magnet component 24 arranged around the central magnet 22 and fixed to the frame 1, and a connecting portion 25 connecting the first central magnetic yoke 21 to the side magnet component 24, wherein the central magnet 22 and the side magnet component 24 are spaced to form a magnetic gap 26.

The first vibration unit 3 includes a first diaphragm 31 fixed to the first bracket 11 and a first voice coil 32 driving the first diaphragm 31 to vibrate to produce sound. The first voice coil 32 is arranged to insert into the magnetic gap 26.

The second vibration unit 4 includes a second diaphragm 41 fixed to the second bracket 12 and a second voice coil 42 driving the second diaphragm 41 to vibrate to produce sound. The second voice coil 42 is arranged to insert into the magnetic gap 26.

Specifically, the central magnet 22 includes a first magnet portion 221 fixed to the first central magnetic yoke 21 and a second magnet portion 222 fixed to the side of the first magnet portion 221 away from the first central magnetic yoke 21. A projection area of the first magnet portion 221 along a vibrating direction is greater than a projection area of the second magnet portion 222 along the vibrating direction. It may also be considered that a width of the first magnet portion 221 along the vibrating direction is greater than a width of the second magnet portion 222 along the vibrating direction. It may be understood that the frame 1 is in a shape of a rectangle. Correspondingly, the first magnet portion 221 and the second magnet portion 222 are also both in a shape of a rectangle. That is, a width of the first magnet portion 221 along a major axis direction is greater than a width of the second magnet portion 222 along the major axis direction, and a width of the first magnet portion 221 along a minor axis direction is also greater than the width of the second magnet portion 222 along the major axis direction.

Thus, the magnetic gap 26 includes a first magnetic gap 261 formed by the first magnet portion 221 and the side magnet component 24 that are spaced apart from each other and a second magnetic gap 262 formed by the second magnet portion 222 and the side magnet component 24 that are spaced apart from each other, the first voice coil 32 is arranged to insert into the first magnetic gap 261, and the second voice coil 42 is arranged to insert into the second magnetic gap 262.

The side magnet component 24 includes a side magnet 241 fixed to the frame 1, a first side magnetically conductive plate 242 fixed to the side of the side magnet 241 facing the first diaphragm 31, and a second side magnetically conductive plate 243 fixed to the side of the side magnet 241 facing the second diaphragm 41, and the connecting portion 25 connects the second side magnetically conductive plate 243 and the first central magnetic yoke 21. The connecting portion 25 is connected to edges of the second side magnetically conductive plate 243 and the first central magnetic yoke 21 along the minor axis direction.

Specifically, the connecting portion 25 includes a first connecting portion 251 connected to the first central magnetic yoke 21, a second connecting portion 252 connected to the second side magnetically conductive plate 243, and a third connecting portion 253 connecting the first connecting portion 251 and the second connecting portion 252. The first connecting portion 251 is fixed to a surface of the first central magnetic yoke 21 facing the central magnet 22. The second connecting portion 252 is fixed to a surface of the second side magnetically conductive plate 243 facing the first central magnetic yoke 21. Further, the third connecting portion 253 extends along the vibrating direction.

Further, in order to improve performance of a magnetic field of the magnetic circuit unit 2 of the sound generator 100, the side magnet 241 includes a first side magnet 2411 arranged along the major axis direction and a second side magnet 2412 arranged along the minor axis direction. Specifically, four first side magnets 2411 are provided, and two of the first side magnets 2411 are arranged in each major axis direction of the frame 1.

Compared with the related art, the sound generator according to the present disclosure includes a first vibration unit and a second vibration unit arranged on two sides of a magnetic circuit unit respectively. The magnetic circuit unit includes a first central magnetic yoke in the middle, a central magnet fixed to the first central magnetic yoke, a magnetic component arranged around the central magnet and fixed to the frame, and a connecting portion connecting the first central magnetic yoke to the magnetic component. The central magnet and the magnetic component are spaced to form a magnetic gap. The central magnet includes a first magnet portion fixed to the first central magnetic yoke and a second magnet portion fixed to the side of the first magnet portion away from the first central magnetic yoke. A projection area of the first magnet portion along a vibrating direction is greater than a projection area of the second magnet portion along the vibrating direction. The arrangement of the first magnet portion having a greater projection area than the second magnet portion effectively increases a volume of the central magnet, and improves performance of a magnetic field of the magnetic circuit unit in a limited space design, thereby improving acoustic performance of the sound generator.

The foregoing descriptions are merely embodiments of the present disclosure. It should be pointed out herein that, for those of ordinary skill in the art, improvements can also be made without departing from the creative conception of the present disclosure, all of which fall within the protection scope of the present disclosure.

What is claimed is:

1. A sound generator, comprising a frame having an accommodation space, a magnetic circuit unit accommodated in the accommodation space, and a first vibration unit and a second vibration unit arranged at two sides of the magnetic circuit unit, respectively, wherein the magnetic circuit unit comprises a first central magnetic yoke at a middle position, a central magnet fixed to the first central magnetic yoke, a side magnet component arranged around the central magnet and fixed to the frame, and a connecting portion connecting the first central magnetic yoke to the side magnet component; and wherein the central magnet and the side magnet component are spaced apart from each other to form a magnetic gap;

wherein the first vibration unit comprises a first diaphragm that is fixed to the frame and a first voice coil that drives the first diaphragm to vibrate to produce sound;

wherein the second vibration unit comprises a second diaphragm that is fixed to the frame and a second voice coil that drives the second diaphragm to vibrate to produce sound; and wherein the central magnet comprises a first magnet portion that is fixed to the first central magnetic yoke and a second magnet portion that is fixed to one side of the first magnet portion away from the first central magnetic yoke, and wherein a projection area of the first magnet portion along a vibrating direction is greater than a projection area of the second magnet portion along the vibrating direction;

wherein the magnetic gap comprises a first magnetic gap formed by the first magnet portion and the side magnet component that are spaced apart from each other, and a second magnetic gap formed by the second magnet portion and the side magnet component that are spaced apart from each other, and wherein the first voice coil is arranged to insert into the first magnetic gap, and the second voice coil is arranged to insert into the second magnetic gap;

wherein the side magnet component comprises a side magnet fixed to the frame, a first side magnetically conductive plate fixed to a side of the side magnet facing the first diaphragm, and a second side magnetically conductive plate fixed to a side of the side magnet facing the second diaphragm, and wherein the connecting portion connects the second side magnetically conductive plate and the first central magnetic yoke;

wherein the connecting portion comprises a first connecting portion connected to the first central magnetic yoke, a second connecting portion connected to the second side magnetically conductive plate, and a third connecting portion connecting the first connecting portion and the second connecting portion, wherein the first connecting portion is fixed to a surface of the first central magnetic yoke facing the central magnet, and the second connecting portion is fixed to a surface of the second side magnetically conductive plate facing the first central magnetic yoke.

2. The sound generator as described in claim 1, wherein the third connecting portion extends along the vibrating direction.

3. The sound generator as described in claim 2, wherein the frame is in a shape of a rectangle, and the connecting portion is connected to edges of the second side magnetically conductive plate and the first central magnetic yoke along a minor axis direction.

4. The sound generator as described in claim 3, wherein the frame comprises a first bracket and a second bracket connected to each other, and wherein the first diaphragm is fixed to a surface of the first bracket away from the second bracket, and the second diaphragm is fixed to a surface of the second bracket away from the first bracket.

5. The sound generator as described in claim 3, wherein the side magnet comprises a first side magnet arranged along a major axis direction and a second side magnet arranged along a minor axis direction.

6. The sound generator as described in claim 5, wherein four first side magnets are provided, and two of the first side magnets are arranged in each major axis direction of the frame.

7. The sound generator as described in claim 1, wherein the magnetic circuit unit further comprises a second central magnetic yoke fixed to a side of the second magnet portion away from the first central magnetic yoke.

* * * * *